US010065565B2

(12) United States Patent
Mozurkewich et al.

(10) Patent No.: US 10,065,565 B2
(45) Date of Patent: Sep. 4, 2018

(54) LINEAR-TRAVEL HANGER ASSEMBLY

(71) Applicant: Ford Global Technologies, LLC, Dearborn, MI (US)

(72) Inventors: Kevin Mozurkewich, Livonia, MI (US); Laura Bunn, Dearborn Heights, MI (US); Kevin Wayne Preuss, Berkley, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/416,762

(22) Filed: Jan. 26, 2017

(65) Prior Publication Data
US 2018/0208121 A1    Jul. 26, 2018

(51) Int. Cl.
| *B60Q 3/233* | (2017.01) |
| *B60R 7/10* | (2006.01) |
| *B60N 3/00* | (2006.01) |
| *B60R 7/04* | (2006.01) |
| *B60N 2/64* | (2006.01) |

(52) U.S. Cl.
CPC .............. *B60R 7/043* (2013.01); *B60N 2/643* (2013.01); *B60N 3/00* (2013.01); *B60Q 3/233* (2017.02); *B60R 7/10* (2013.01)

(58) Field of Classification Search
CPC .............. B60R 7/10; B60Q 3/233; B60N 3/00
See application file for complete search history.

(56) References Cited

U.S. PATENT DOCUMENTS

| 338,677 | A |   | 3/1886 | Rubenstein |
| 3,424,418 | A |   | 1/1969 | Freedman et al. |
| 4,600,978 | A | * | 7/1986 | Kimura ................. F21S 8/028 |
|   |   |   |   | 362/269 |
| 4,720,028 | A |   | 1/1988 | Takemura et al. |
| 5,507,423 | A |   | 4/1996 | Fischer et al. |
| 5,791,614 | A |   | 8/1998 | Sims |
| 6,095,469 | A |   | 8/2000 | Von Alman |
| 7,669,821 | B2 |   | 3/2010 | Martin |
| 8,272,548 | B2 | * | 9/2012 | Le Texier .............. B60R 11/02 |
|   |   |   |   | 224/281 |
| 9,731,657 | B1 | * | 8/2017 | Salter ................... B60Q 3/0223 |
| 2001/0002092 | A1 | * | 5/2001 | Reitze ..................... B60N 2/44 |
|   |   |   |   | 297/217.6 |
| 2004/0109324 | A1 | * | 6/2004 | Tiesler ................... B60N 3/023 |
|   |   |   |   | 362/488 |
| 2007/0076415 | A1 | * | 4/2007 | Chou ...................... F21V 21/26 |
|   |   |   |   | 362/427 |
| 2009/0001789 | A1 | * | 1/2009 | Brown ................... B60Q 3/233 |
|   |   |   |   | 297/217.6 |
| 2016/0102851 | A1 | * | 4/2016 | Huelke .................... B60R 7/10 |
|   |   |   |   | 362/253 |
| 2016/0257247 | A1 | * | 9/2016 | Munday ................... B60Q 3/44 |

FOREIGN PATENT DOCUMENTS

DE    102011112438 A1    3/2013

* cited by examiner

*Primary Examiner* — Timothy J Brindley
(74) *Attorney, Agent, or Firm* — Vichit Chea; Price Heneveld LLP

(57) ABSTRACT

A vehicle seating assembly includes a seat and a seatback. A retainer assembly is positioned in a rearward portion of the seatback. The retainer assembly includes a linear-travel hanger assembly that engages with the retainer assembly in a substantially continuous manner when in a stowed position.

20 Claims, 9 Drawing Sheets

LINEAR-TRAVEL HANGER ASSEMBLY

FIELD OF THE DISCLOSURE

The present disclosure generally relates to a hanger assembly. More specifically, the present disclosure relates to a linear-travel hanger assembly.

BACKGROUND OF THE INVENTION

Storage in a vehicle is a feature often considered by consumers when deciding between vehicles to purchase. Available storage solutions typically include glove boxes, center consoles, cup holders, pockets, recesses, cubbies, and general cargo areas. However, occupants that carry handbags or purses generally are not provided with a dedicated storage area in the vehicle for their handbags or purses. Therefore, a need exists for a vehicle storage solution for the handbag or purse of an occupant that is functional, aesthetically pleasing, and does not create safety hazards.

SUMMARY OF THE INVENTION

According to one aspect of the present disclosure, a vehicle seating assembly includes a seat, a seatback, and a retainer assembly. The retainer assembly is positioned in a rearward portion of the seatback. The retainer assembly includes a recess, a bezel, and a linear-travel hanger assembly. The bezel is positioned about a perimeter of the recess. The linear-travel hanger assembly is extendably coupled to the recess. When in a stowed position, the linear-travel hanger assembly engages with the bezel in a substantially continuous manner such that a snagging hazard is avoided for occupants of a rearward portion of a vehicle. The linear-travel hanger assembly is movable between the stowed position and a use position via a push-push mechanism.

According to another aspect of the present disclosure, a vehicle seating assembly includes a seat, a seatback, and a retainer assembly. The retainer assembly is positioned in a rearward portion of the seatback. The retainer assembly includes a linear-travel hanger assembly that engages with the retainer assembly in a substantially continuous manner when in a stowed position. The linear-travel hanger assembly is movable between the stowed position and a use position via a push-push mechanism.

According to yet another aspect of the present disclosure, a vehicle seating assembly includes a seat, a seatback, and a retainer assembly. The retainer assembly is positioned in a rearward portion of the seatback. The retainer assembly includes a linear-travel hanger assembly that engages with the retainer assembly in a substantially continuous manner when in a stowed position.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 2:
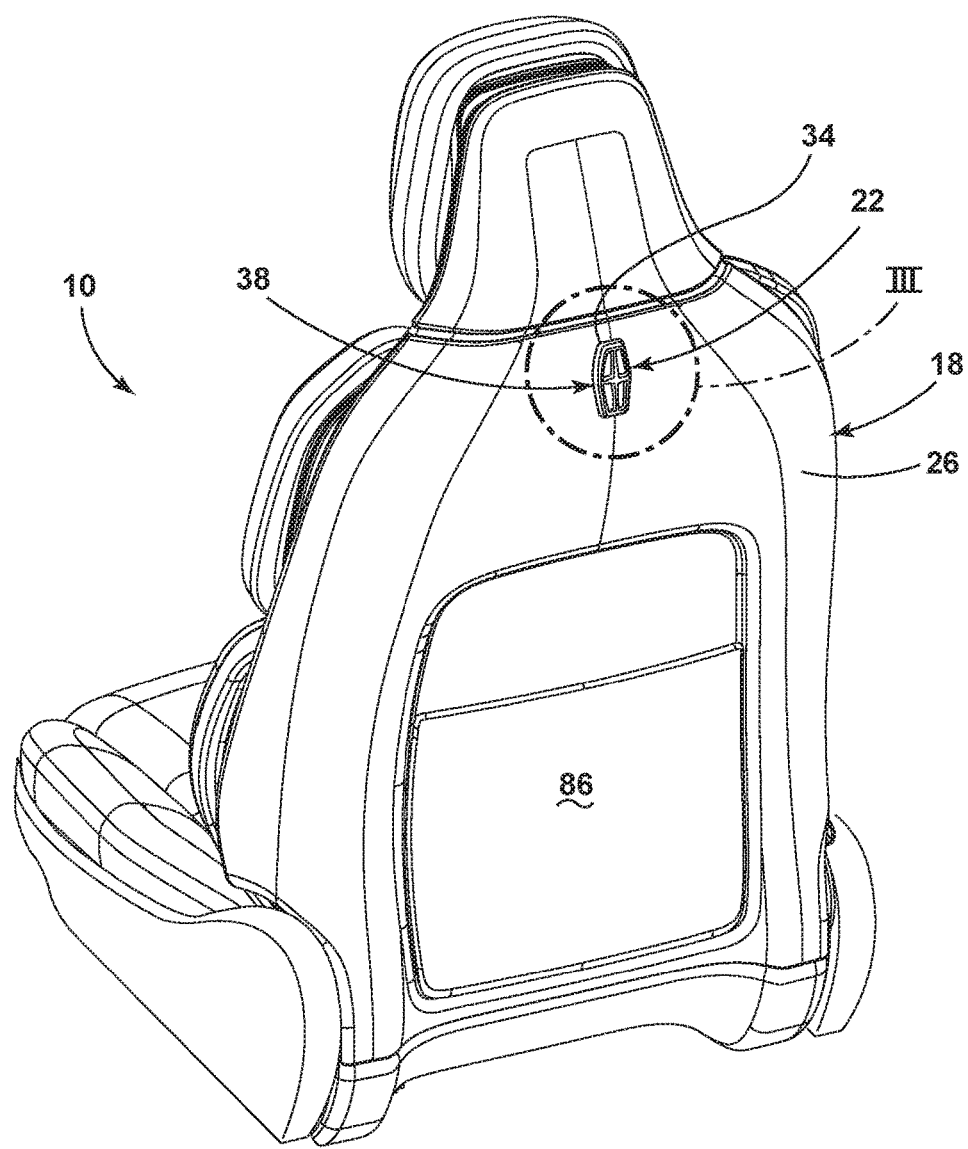
FIG. 2 is a rear perspective view of the vehicle seating assembly illustrating the retainer assembly.

For purposes of description herein, the terms "upper," "lower," "right," "left," "rear," "front," "vertical," "horizontal," and derivatives thereof shall relate to the concepts as oriented in FIG. 2. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a retainer assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-8, a vehicle seating assembly 10 is illustrated having a seat 14 and a seatback 18. A retainer assembly 22 is positioned in a rearward portion 26 of the seatback 18. The retainer assembly 22 includes a recess 30, a bezel 34, and a linear-travel hanger assembly 38. The bezel 34 is positioned about a perimeter of the recess 30. The linear-travel hanger assembly 38 is extendably coupled to the recess 30. The linear-travel hanger assembly 38, when in an inward stowed position, engages with the bezel 34 in a substantially continuous manner such that a snagging hazard is avoided for occupants seated in a rearward portion of a vehicle. The linear-travel hanger assembly 38 is movable between the inward stowed position and an outward extending use position via a push-push mechanism 42.

Figure 1:
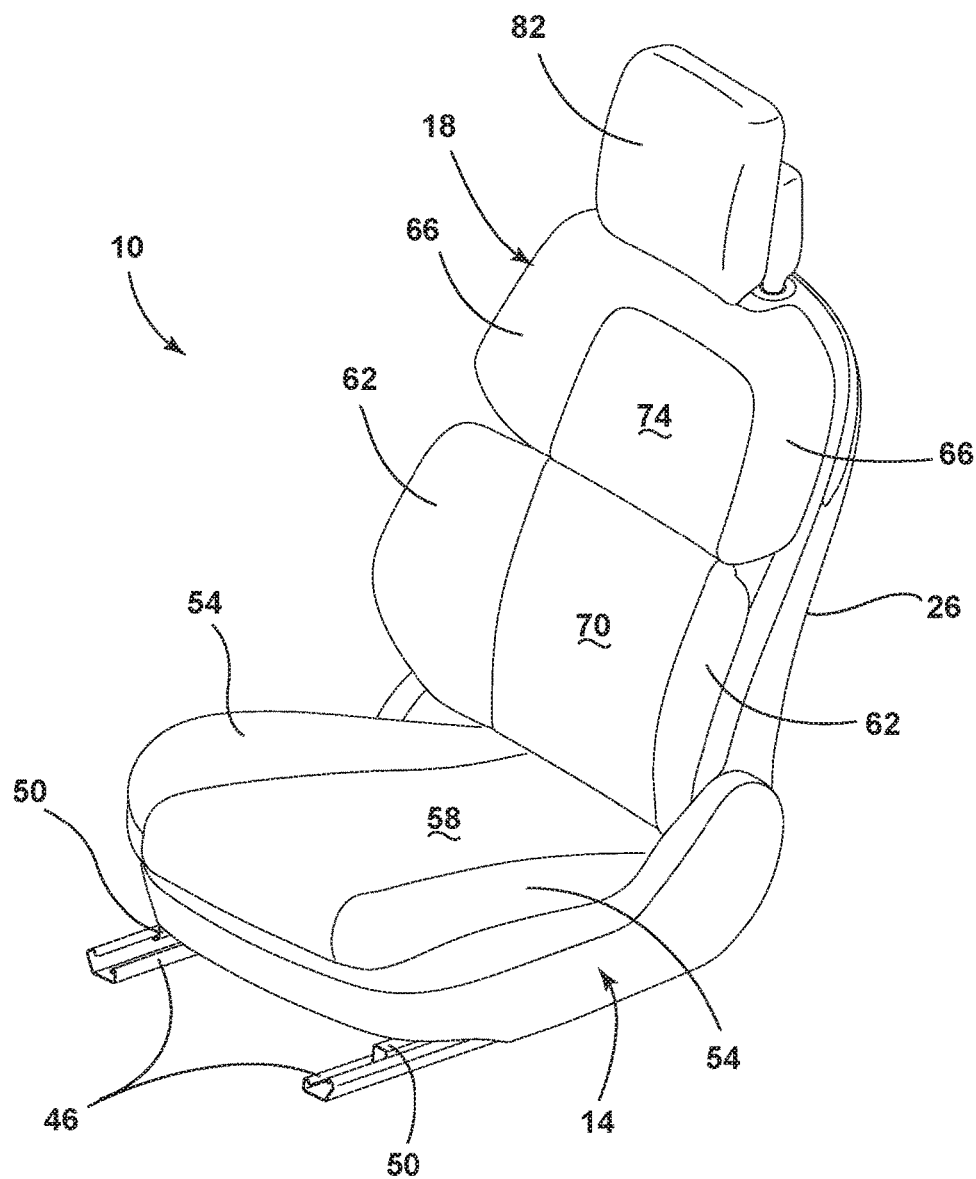
FIG. 1 is a front perspective view of a vehicle seating assembly equipped with a linearly deployable hanger retainer assembly.

Referring particularly to FIG. 1, the seatback 18 may be pivotably coupled to the seat 14. The vehicle seating assembly 10 includes mounting rails 46 on the bottom. The mounting rails 46 can be operably coupled with a support structure, such as the floor of a vehicle, and slidably engage with positioning rails 50 that allow an occupant to adjust the position of the vehicle seating assembly 10 relative to the vehicle. The positioning rails 50 are operably coupled to an underside of the seat 14. The seat 14 can include side bolsters 54 that flank either side of a central seat portion 58. The seatback 18 can include lumbar side bolsters 62, shoulder side bolsters 66, a central lumbar portion 70, and a central shoulder portion 74. The seatback 18 can further include the rearward portion 26. A headrest 82 can be extendably coupled to a top side of the seatback 18.

Referring now to FIG. 2, the rearward portion 26 of the seatback 18 can be equipped with various functionality such as a pocket 86 and the retainer assembly 22. The shape and appearance of the retainer assembly 22 can be configured and/or customized to provide various branding options. For example, the retainer assembly 22 can be used to present a rear seat passenger with the emblem or logo that is associated with the vehicle manufacture that is providing the vehicle seating assembly 10, the emblem or logo associated with the vehicle trim package chosen by the purchaser of the vehicle, and/or a customized emblem or logo chosen by the consumer.

Figure 3:
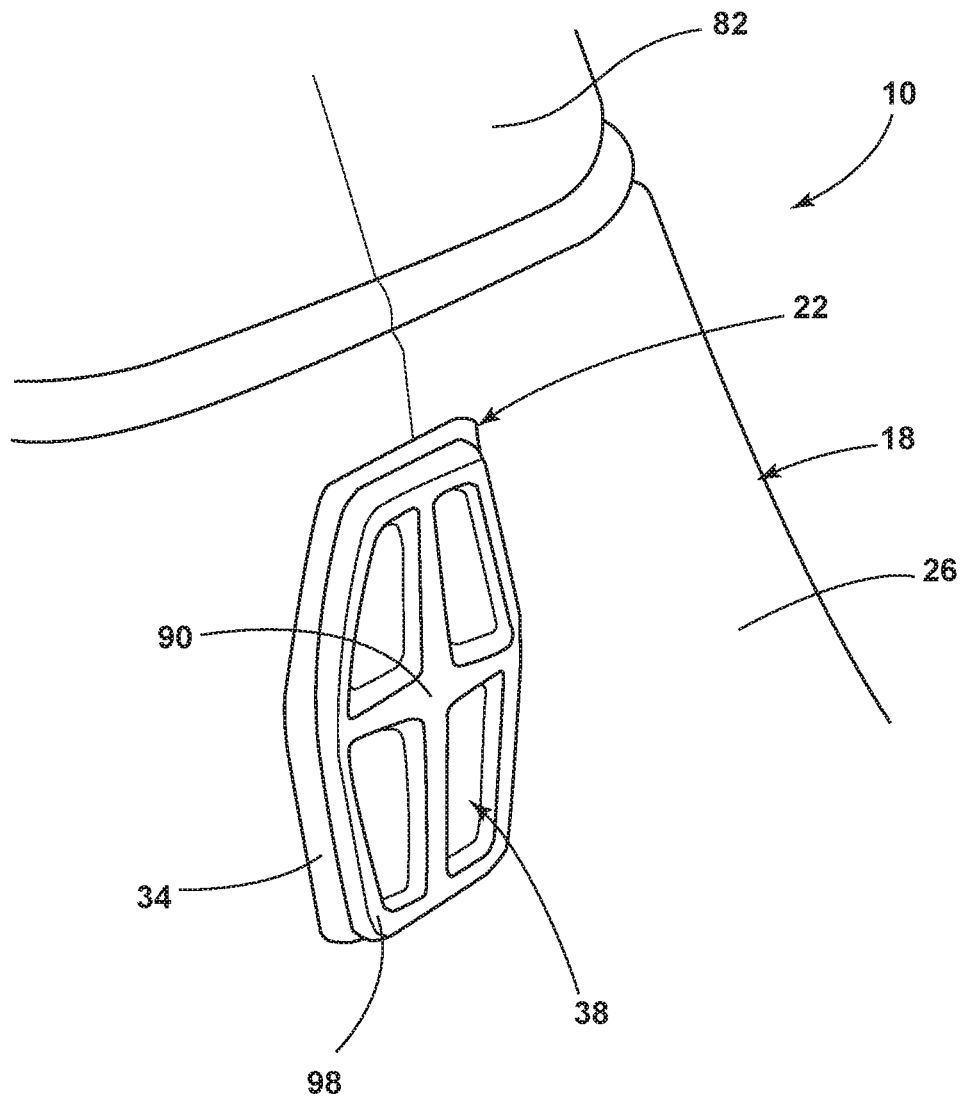
FIG. 3 is an expanded view taken at section III of FIG. 2 of a rearward portion of a seatback, showing the retainer assembly in a stowed position.
Figure 4:
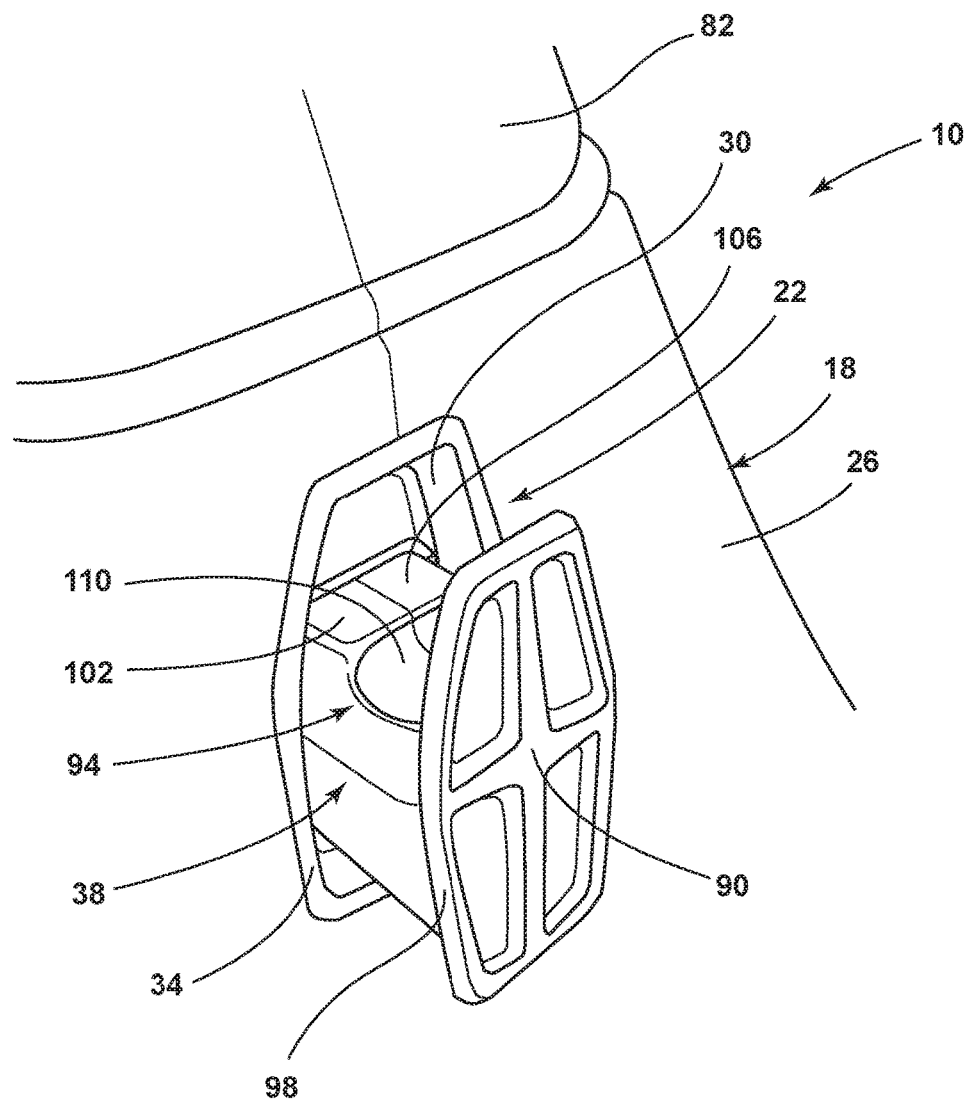
FIG. 4 is an expanded view taken at section III of FIG. 2 of the rearward portion of the seatback, showing the retainer assembly in a use position.
Figure 5:
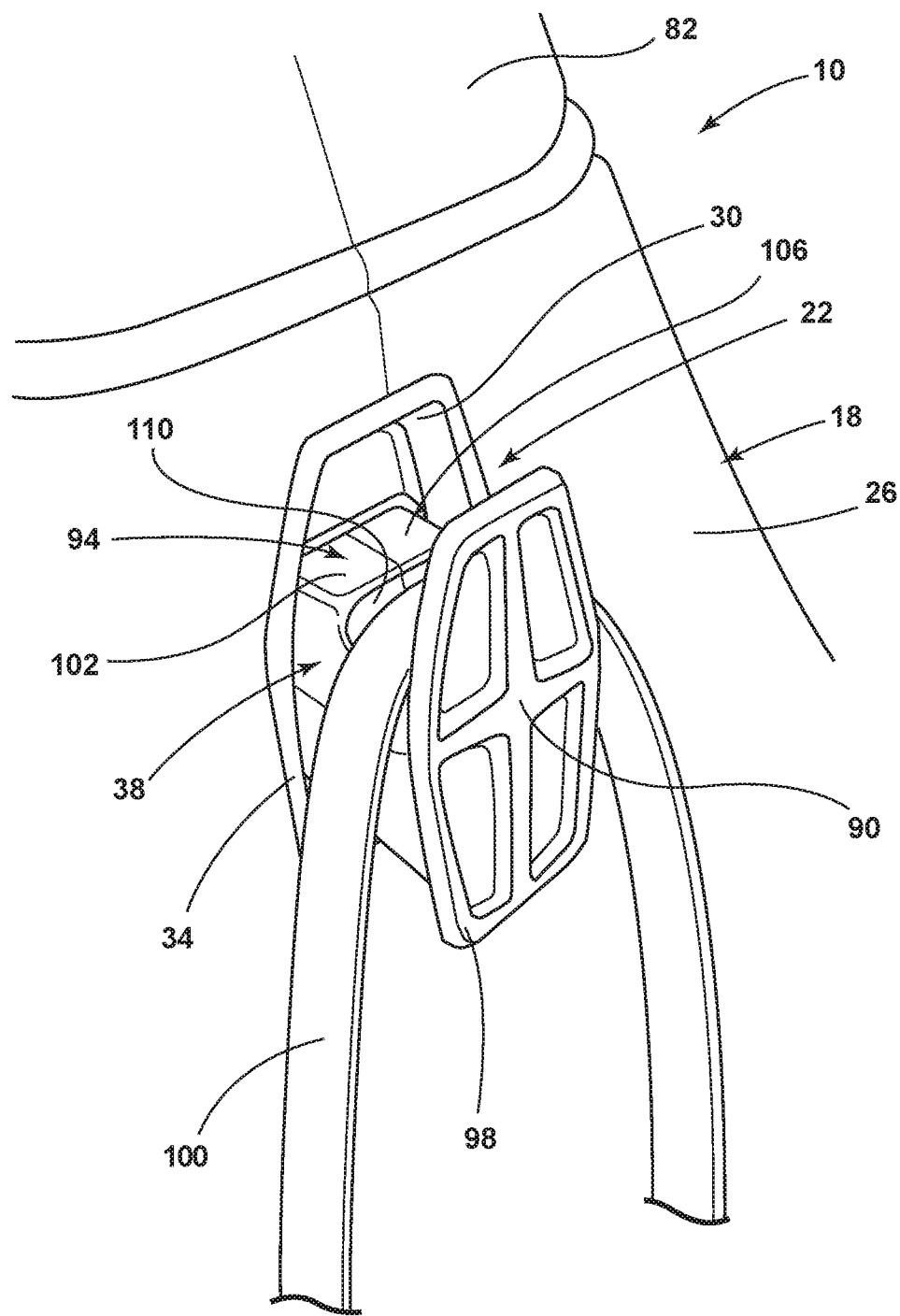
FIG. 5 is an expanded view taken at section III of FIG. 2 of the rearward portion of the seatback, showing the retainer assembly in the use position and supporting an article.
Figure 8:
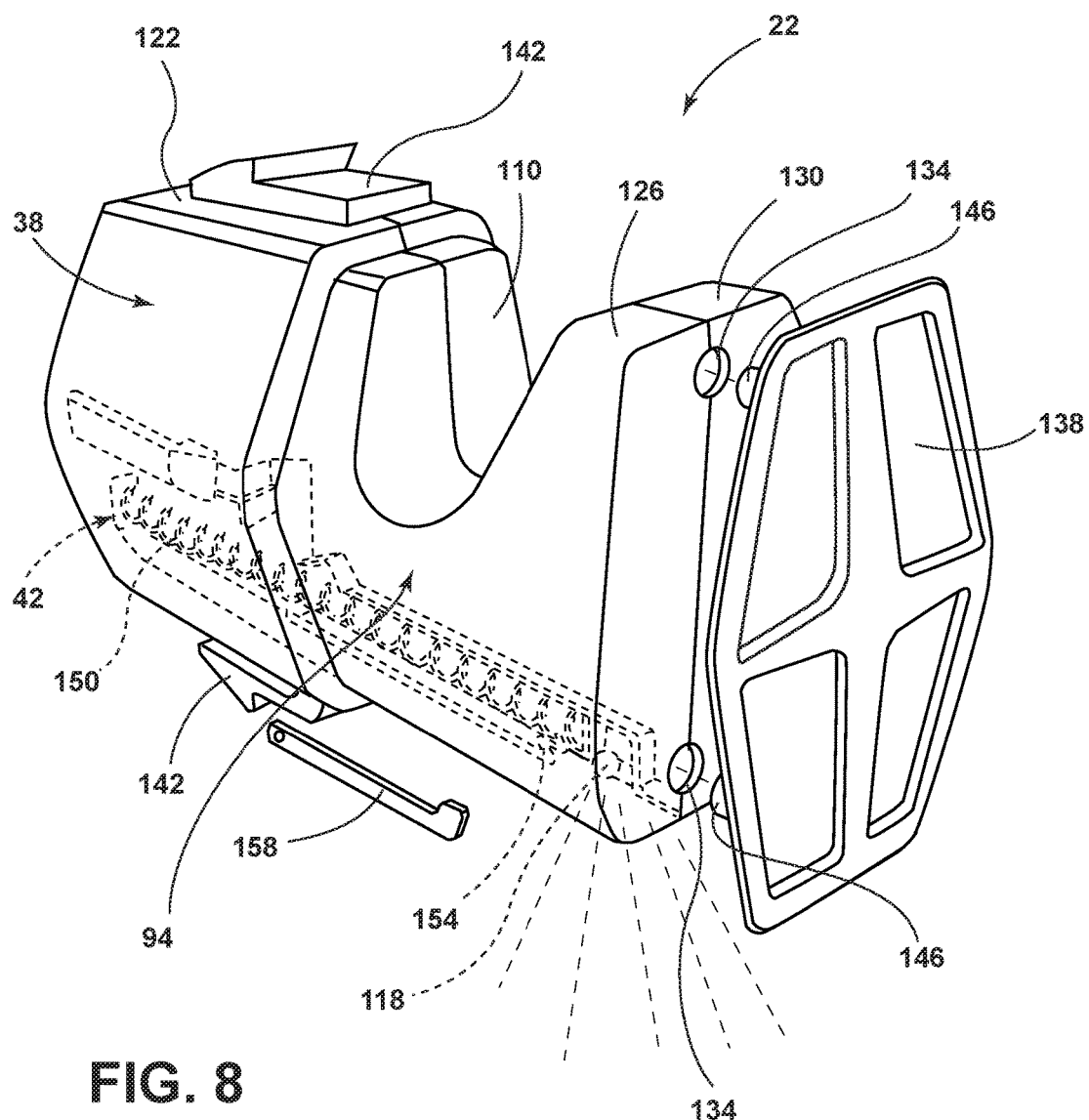
FIG. 8 is an exploded view of the retainer assembly.

Referring to FIGS. 3-5, the retainer assembly 22 includes the recess 30, the bezel 34, and the linear-travel hanger assembly 38. The retainer assembly 22 is vertically positioned in the rearward portion 26 of the seatback 18 proximal the headrest 82. The bezel 34 is positioned about the perimeter of the recess 30. The linear-travel hanger assembly 38 is coupled to the recess 30. The linear-travel hanger assembly 38 can be transitioned between a stowed position and a use position by the push-push mechanism 42 (FIG. 8). When in the stowed position, the linear-travel hanger assembly 38 is retracted within the recess 30 and engages with the bezel 34 in a substantially continuous manner such that it is substantially flush with the bezel and 34 and rearward portion 26. In other words, while the linear-travel hanger assembly 38 is in the stowed position, the linear-travel hanger assembly 38 engages with the bezel 34 to present rear passengers with a flush or generally smooth rearward portion 26 of the seatback 18. This generally smooth surface of the rearward portion 26 decreases or entirely eliminates a snagging hazard for the rear seat occupants of the vehicle. To move the linear-travel hanger assembly 38 from the stowed position (FIG. 3) to the outward extending use position (FIG. 4) a user presses inward on a surface 90 of the linear-travel hanger assembly 38. This inward pressing on the surface 90 of the linear-travel hanger assembly 38 activates the push-push mechanism 42 such that the linear-travel hanger assembly 38 extends out of the recess 30 to expose a post assembly 94. A vertical portion 98 is coupled to the post assembly 94 in a transverse manner. The post assembly 94 extends linearly outward to expose a gap between the bezel 34 and the vertical portion 98 to allow an article 100 to hang on the post assembly 94. The post assembly 94 includes an upper surface 102 that has a planar portion 106 and a concave portion 110. The concave portion 110 is configured to support the article 100 (e.g. a purse, grocery bag, hand bag, clothes hanger, etc.). More than one article 100 can be supported by the post assembly 94. The post assembly 94 can support articles on either the planar portion 106 or the concave portion 110.

Figure 6:
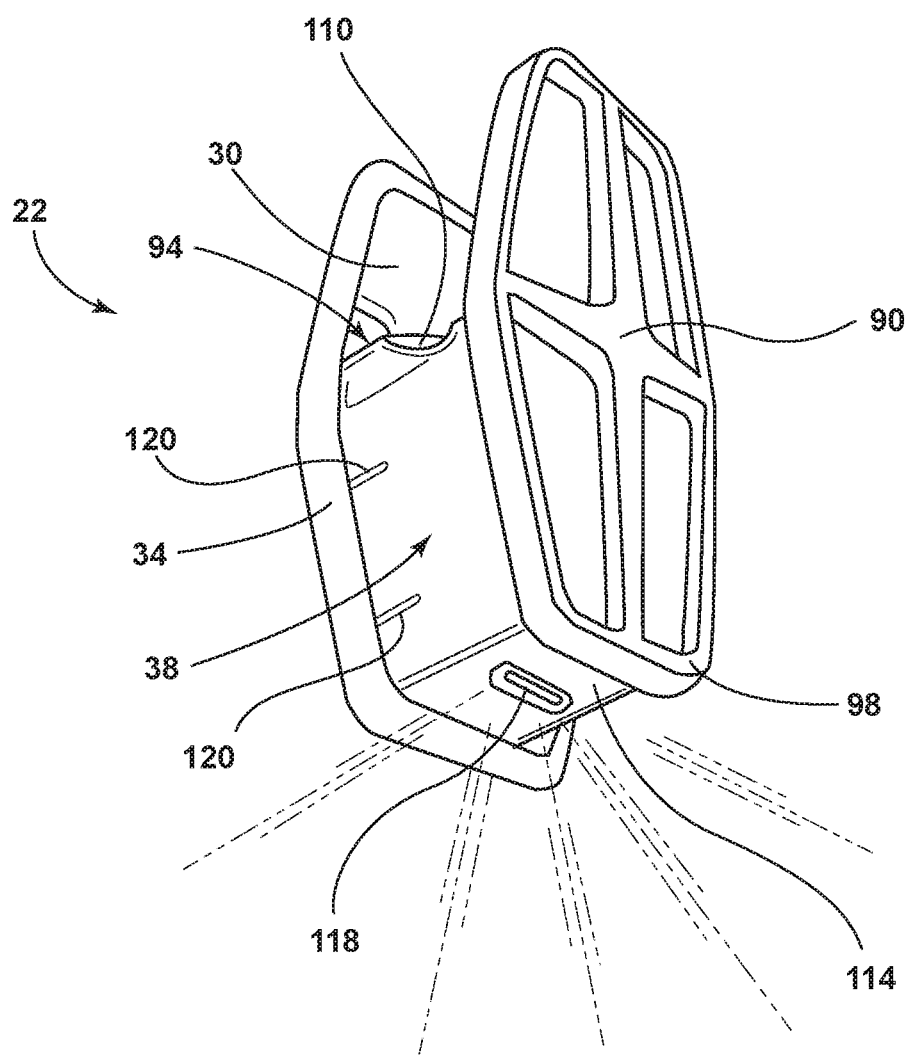
FIG. 6 is a bottom perspective view of the retainer assembly in the use position.
Figure 7:
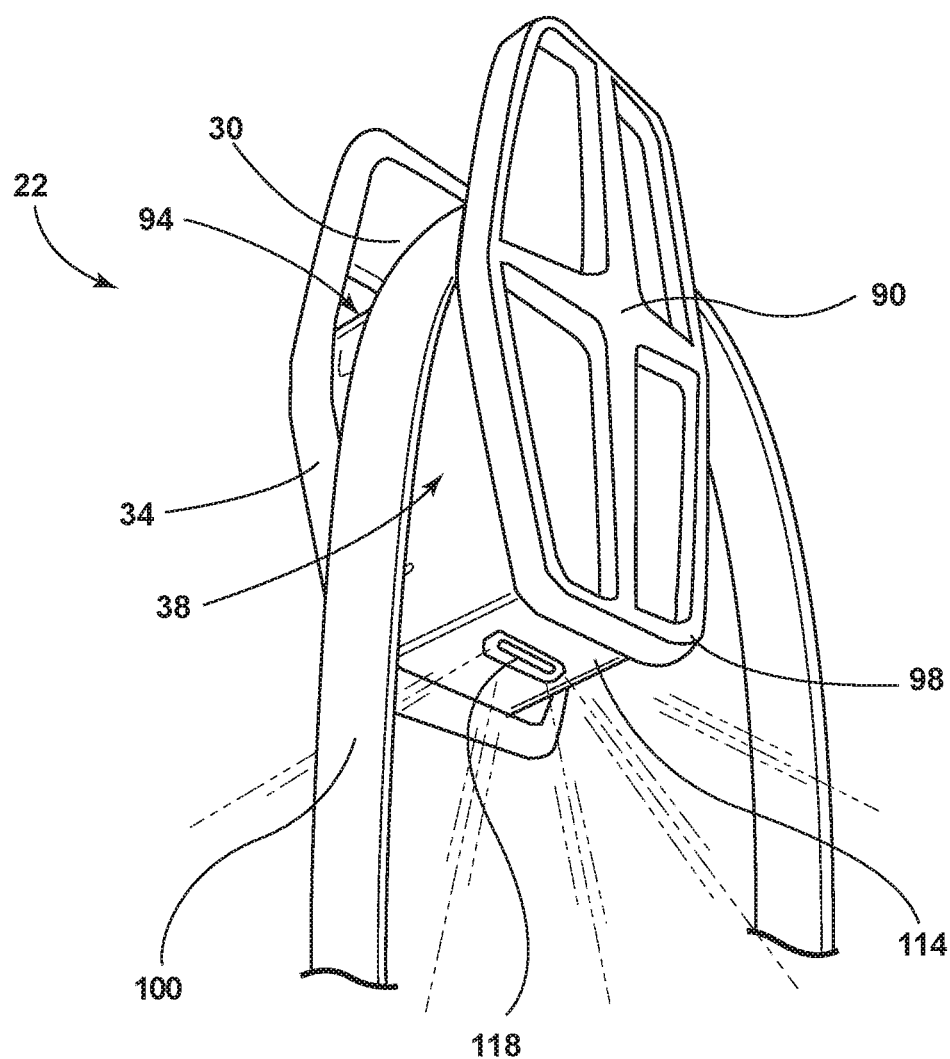
FIG. 7 is a bottom perspective view of the retainer assembly in the use position and supporting an article.

Referring now to FIGS. 6 and 7, the post assembly 94 further includes a lower surface 114 equipped with a light source 118. The light source 118 can be recessed in the lower surface 114 of the post assembly 94. The light source 118 is configured to illuminate a space within the vehicle that is below the retainer assembly 22. The light source 118 can be any photon-emitting form of illumination. For example, the light source 118 can be incandescent, halogen, luminescent, phosphorescent, fluorescent, metal halide, light emitting diode (LED), neon, high intensity discharge, low pressure sodium, and so on. When the article 100 is supported on the post assembly 94, as shown in FIG. 7, the light source 118 can illuminate an interior of the article 100. Additionally or alternatively, the light source 118 can be used to illuminate the pocket 86 (FIG. 2), a rear floor board, a rear seat, provide ambient lighting, and/or reading material for a rear seat passenger. The post assembly 94 can further include guide channels 120 that prevent the post assembly 94 from traveling in non-linear directions during extension or retraction of the linear-travel hanger assembly 38. In other words, the guide channels 120 prevent misalignment or binding of the post assembly 94 during transitions between the stowed position and the use position. The vertical portion 98 and/or the concave portion 110 can provide secure retention of the article 100 supported by the retainer assembly 22.

Referring to FIG. 8, the retainer assembly 22 is shown removed from the recess 30 in the rearward portion 26 of the seatback 18. The retainer assembly 22 further includes a main housing 122, a first hanger housing 126, a second hanger housing 130, at least one emblem-mounting aperture 134, and a removable emblem 138. The main housing 122 can be equipped with locking tabs 142 that facilitate rapid and easy installation of the retainer assembly 22 within the recess 30. The first and second hanger housings 126, 130 can be coupled in a snap-fit fashion to provide the linear-travel hanger assembly 38. The emblem-mounting apertures 134 are configured to receive protrusions 146 that extend from the removable emblem 138. A spring 150 is provided in the retainer assembly 22 that is positioned within, and extends between, the main housing 122 and the first and second hanger housings 126, 130. The spring 150 provides a biasing force that drives the linear-travel hanger assembly 38 to the outward extending use position when the push-push mechanism 42 is actuated from the stowed position to the use position. Similarly, the user overcomes the biasing force when pressing inward on the removable emblem 138 when the push-push mechanism 42 is actuated from the use position to the stowed position. A locking channel 154 is provided in the first and second hanger housings 126, 130 to guide a locking member 158 through a travel path. The travel path provides the push-push mechanism 42 with the ability to transition the linear-travel hanger assembly 38 between the stowed position and the outward extending use position. Additionally, the travel path facilitates the locking of the linear-travel hanger assembly 38 in the stowed and outward extending use position with successive or alternating actuations of the push-push mechanism 42.

Figure 10:
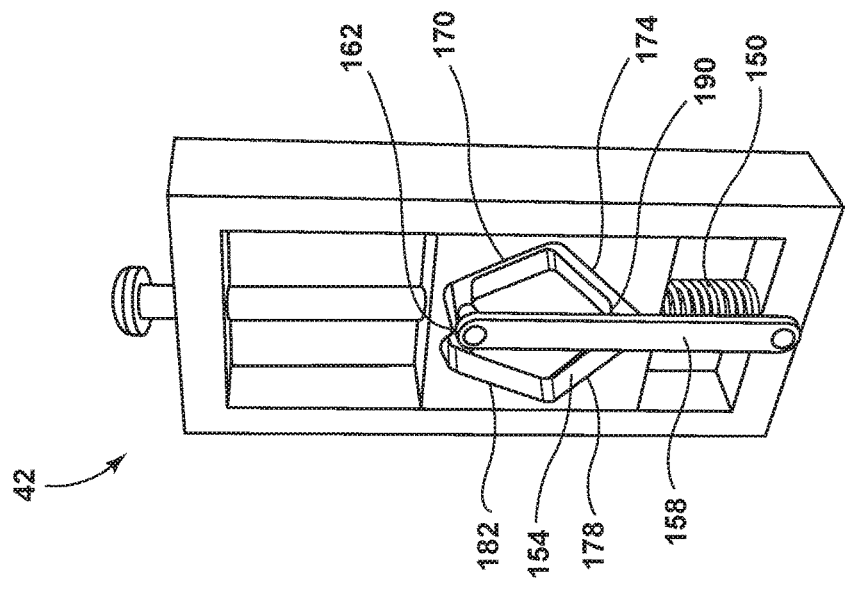
FIG. 10 is a bottom perspective view of the push-push mechanism in the stowed position, according to one embodiment.
Figure 9:
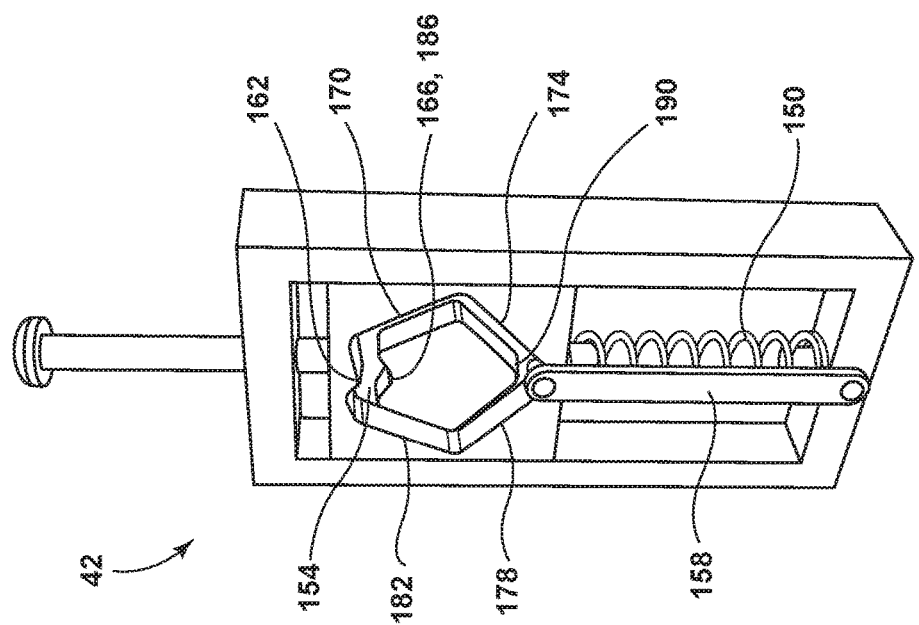
FIG. 9 is a bottom perspective view of a push-push mechanism in the use position, according to one embodiment.

Referring now to FIGS. 8-10, the locking member 158 is operably coupled to the main housing 122 and travels within the locking channel 154. The combination of the spring 150, the locking channel 154, and the locking member 158 make up at least a portion of the push-push mechanism 42. The push-push mechanism 42 is the mechanism responsible for the locking of the linear-travel hanger assembly 38 in the stowed position, the locking of the linear-travel hanger assembly 38 in the outwardly extended use position, and the actuation of the linear-travel hanger assembly 38 between the stowed position and the use position. The light source 118 is positioned within the first and second hanger housings 126, 130 and provides illumination to an area below the retainer assembly 22. The light source 118 can be automatically activated when the retainer assembly 22 is placed in the use position. Similarly, the light source 118 can be automatically deactivated when the linear-travel hanger assembly 38 is placed in the stowed position.

Referring particularly to FIGS. 9 and 10, one embodiment of the push-push mechanism 42 is shown from a bottom perspective view. The resilient member 158 travels through the travel path provided by the locking channel 154. The locking channel 154 can be generally pentagonal in shape with a first face 162 of the pentagon having an indentation 166 intermediately spaced along the first face 162 of the pentagon, thereby creating a six-sided polygon. In other words, the generally pentagonal shape can have the first face 162 protrude inwardly toward the center of the pentagon. The remaining sides of the generally pentagonal shape can include a second face 170, a third face 174, a fourth face 178, and a fifth face 182. The second face 170, the third face 174, the fourth face 178, and the fifth face 182 can be of equal length relative to one another. The indentation 166 defines a first apex 186 of the side of the pentagon that has been extended inwardly toward the center of the polygon and represents either the outwardly extended use position (FIG. 9) or stowed position (FIG. 10) of the linear-travel hanger assembly 38. A second apex 190 of the polygon is in direct line with the first apex 186 and the second apex 190 represents the other of the stowed or use position of the linear-travel hanger assembly 38.

The linear-travel hanger assembly 38 described herein provides consumers with a functional and aesthetically pleasing storage solution that does not create safety hazards. An example of the type of article 100 that can be supported on the linear-travel hanger assembly 38 is a handbag. More specifically, the linear-travel hanger assembly 38 can receive the strap or handle of a handbag. For example, the linear-travel hanger assembly 38 can receive at least one 20 mm handbag strap. Additionally, the retainer assembly 22 is positioned on the rearward portion 26 of the seatback 18 such that the article 100 hangs and remains suspended above the floor board of the vehicle. Further, the linear-travel hanger assembly 38 can support a load that is static or dynamic of at least about 4.5 kilograms (10 pounds), according to one specific example. While shown as a single retainer assembly 22 in the rearward portion 26 of the seatback 18, it is contemplated that more than one retainer assembly 22 and more than one linear-travel hanger assembly 38 per retainer assembly 22 can be utilized without departing from the concepts disclosed herein.

The linear-travel hanger assembly 38 is provided with the added benefit of being easily deployable. The deployable nature of the linear-travel hanger assembly 38 permits stowage of the linear-travel hanger assembly 38 when not in use, thereby decreasing or eliminating snagging hazards for rearward seated passengers. The actuation or deployment of the linear-travel hanger assembly 38 can be tuned to meet various requirements, specifications, and/or user-experience metrics. The vertical portion 98 of the linear-travel hanger assembly 38 provides customizable branding options. The branding option chosen can impact the size and/or dimensions of the retainer assembly 22 and/or the linear-travel hanger assembly 38. While the size and/or dimensions of the retainer assembly 22 and/or the linear-travel hanger assembly 38 can vary the operation of the retainer assembly 22 and/or the linear-travel hanger assembly 38 remain constant. The rapid and easy installation and/or removal of the linear-travel hanger assembly 38 that is facilitated by the locking tabs 142 also allows the linear-travel hanger assembly 38 and/or the retainer assembly 22 to be removed for repair, replacement, and/or customization. When the article 100 is supported on the post assembly 94, as shown in FIG. 7, the light source 118 can illuminate an interior of the article 100. Additionally or alternatively, the light source 118 can be used to illuminate the pocket 86 (FIG. 2), a rear floor board, a rear seat, provide ambient lighting, and/or reading material for a rear seat passenger.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A vehicle seating assembly comprising:
  a retainer assembly positioned in a rearward portion of a seatback, wherein the retainer assembly comprises:
    a recess;
    a bezel positioned about a perimeter of the recess; and
    a linear-travel hanger assembly extendably coupled to the recess, wherein the linear-travel hanger assembly, when in a stowed position, engages with the bezel in a substantially continuous manner such that a snagging hazard is avoided for occupants of a rearward portion of a vehicle, wherein the linear-travel hanger assembly is movable between the stowed position and a use position via a push-push mechanism, wherein the push-push mechanism comprises a locking channel that guides a locking member through a travel path, wherein the travel path is generally pentagonal in shape with a first face of the pentagon having an indentation intermediately spaced therein that defines a first apex, thereby creating a six-sided polygon, wherein a second apex is in direct line with the first apex, wherein the first and second apexes each represent one of the stowed position and the use position, and wherein the locking member remains in a substantially constant vertical position while traversing the travel path.

2. The vehicle seating assembly of claim 1, wherein the retainer assembly is vertically positioned in the rearward portion of the seatback proximal a headrest of the seatback.

3. The vehicle seating assembly of claim 1, wherein the linear-travel hanger assembly includes a post assembly and a vertical portion, and wherein the post assembly and the vertical portion are coupled in a transverse manner.

4. The vehicle seating assembly of claim 3, wherein the post assembly includes an upper surface having a planar portion and a concave portion.

5. The vehicle seating assembly of claim 4, wherein the concave portion is configured to support an article.

6. The vehicle seating assembly of claim 5, wherein the article is a handbag.

7. The vehicle seating assembly of claim 3, wherein the post assembly includes a lower surface having a light source.

8. The vehicle seating assembly of claim 7, wherein the light source is recessed in the lower surface of the post assembly.

9. A vehicle seating assembly comprising:
  a retainer assembly positioned in a rearward portion of a seatback, wherein the retainer assembly includes a linear-travel hanger assembly that engages with the retainer assembly in a substantially continuous manner when in a stowed position, and wherein the linear-travel hanger assembly is movable between the stowed position and a use position via a push-push mechanism having a locking channel with a travel path that is generally pentagonal in shape.

10. The vehicle seating assembly of claim 9, wherein the retainer assembly further comprises:
  a recess; and
  a bezel positioned about a perimeter of the recess.

11. The vehicle seating assembly of claim 9, wherein the retainer assembly is vertically positioned in the rearward portion of the seatback proximal a headrest of the seatback.

12. The vehicle seating assembly of claim 9, wherein the linear-travel hanger assembly includes a post assembly and a vertical portion, and wherein the post assembly and the vertical portion are coupled in a transverse manner.

13. The vehicle seating assembly of claim 12, wherein the post assembly includes an upper surface having a planar portion and a concave portion.

14. The vehicle seating assembly of claim 13, wherein the concave portion is configured to support an article.

15. The vehicle seating assembly of claim 12, wherein the post assembly includes a lower surface having a light source.

16. A vehicle seating assembly comprising: a retainer assembly positioned in a rearward portion of a seatback, wherein the retainer assembly includes a linear-travel hanger assembly having a locking channel that guides a locking member through a travel path that is generally pentagonal in shape, and wherein the locking member remains in a substantially constant vertical position while varying a horizontal position during traversal of the travel path.

17. The vehicle seating assembly of claim 16, wherein the retainer assembly further comprises:
  a recess; and
  a bezel positioned about a perimeter of the recess, wherein the linear-travel hanger assembly engages with the bezel in a substantially continuous manner when in a stowed position.

18. The vehicle seating assembly of claim 16, wherein the linear-travel hanger assembly includes a post assembly and a vertical portion, and wherein the post assembly and the vertical portion are coupled in a transverse manner.

19. The vehicle seating assembly of claim 18, wherein the post assembly includes an upper surface having a planar portion and a concave portion, and wherein the concave portion is configured to support an article.

20. The vehicle seating assembly of claim 18, wherein the post assembly includes a lower surface having a light source.

* * * * *